(12) United States Patent
Valiquette et al.

(10) Patent No.: US 11,303,638 B2
(45) Date of Patent: Apr. 12, 2022

(54) ATOMIC UPDATE OF ACCESS CONTROL LIST RULES

(71) Applicant: Intel Corporation, Santa Clara, CA (US)

(72) Inventors: Real Valiquette, St-Bruno (CA); Carl Geoffrion, Saint-Jean-sur-Richelieu (CA)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 16/023,198

(22) Filed: Jun. 29, 2018

(65) Prior Publication Data

US 2020/0007547 A1 Jan. 2, 2020

(51) Int. Cl.
*H04L 29/06* (2006.01)
*G06F 15/173* (2006.01)

(52) U.S. Cl.
CPC ...... *H04L 63/101* (2013.01); *G06F 15/17331* (2013.01)

(58) Field of Classification Search
CPC ............................ H04L 63/101; G06F 15/1733
USPC ........................................................ 726/29
See application file for complete search history.

(56) References Cited

U.S. PATENT DOCUMENTS

| | | | |
|---|---|---|---|
| 2016/0026660 A1* | 1/2016 | Mukherjee | G06F 16/2255 707/803 |
| 2018/0218005 A1* | 8/2018 | Kuhtz | G06F 16/1752 |

OTHER PUBLICATIONS

Lakshminarayanan, Karthik, et al., "Algorithms for Advanced Packet Classification with Ternary CAMs," ACM SIGCOMM 2005, Aug. 22-26, 2005, Philadelphia, PA; 36 pages.

* cited by examiner

*Primary Examiner* — Evans Desrosiers
(74) *Attorney, Agent, or Firm* — Patent Capital Group

(57) ABSTRACT

There is disclosed in one example a network switching apparatus, including: a plurality ingress port; a plurality of egress ports; a ternary content addressable memory (TCAM) comprising a plurality of chunks, wherein the chunks can be atomically enabled or disabled; a switching circuit to switch traffic from the ingress port to a selected egress port according to an access control list (ACL) of the TCAM; and one or more non-transitory mediums having stored thereon instructions to atomically add or update two or more target rules, including: add the two or more target rules to one or more target-rule chunks; and atomically enable the target-rule chunks.

24 Claims, 15 Drawing Sheets

PRECEDENCE →

ACL TABLE 200

| CHUNK | ROW | CHUNK STATE | ROW STATE | PRECEDENCE | CONDITION → ACTION |
|---|---|---|---|---|---|
| 0 | 0 | Enabled | Active | 0 | DIP 0.0.0.0/0.0.0.0 → Trap |
| 0 | 1 | Enabled | Inactive | | Empty |
| 0 | 2 | Enabled | Active | 5 | DMAC 01:80:C2:XX:XX:XX → Drop |
| 0 … 2 | 3 … 130 | Enabled | Inactive | | Empty |
| 2 | 131 | Enabled | Active | 8 | DMAC 01:80:C2:00:00:01 → Trap |
| 2 | 132 | Enabled | Active | 10 | DIP 1.x.x.x → Permit |
| 2 … 5 | 133 … 384 | Enabled | Inactive | | Empty |
| 6 | 385 | Enabled | Active | 11 | DIP 1.2.x.x → Redirect Port 4 |
| 6 | 386 | Enabled | Active | 11 | DIP 7.8.x.x → Redirect Port 3 |
| 6 | 387 | Enabled | Active | 15 | DIP 7.8.x.x + UDP → Redirect Port 2 |
| 6 | 388 | Enabled | Active | 20 | DIP 7.8.9.x → Flood |
| 6 | 389 | Enabled | Active | 21 | DIP 7.8.9.10 → Drop |
| 6 | 390 | Enabled | Active | 25 | Checksum Error → Trap |
| 7 … 15 | 391 … 1023 | Enabled | Inactive | | Empty |

*Fig. 2*

ACL TABLE 200

PRECEDENCE →

| CHUNK | ROW | CHUNK STATE | ROW STATE | PRECEDENCE | CONDITION → ACTION |
|---|---|---|---|---|---|
| 0 | 0 | Enabled | Active | 0 | DIP 0.0.0.0/0.0.0.0 → Trap |
| 0 | 1 | Enabled | Inactive | | Empty |
| 0 | 2 | Enabled | Active | 5 | DMAC 01:80:C2:XX:XX:XX → Drop |
| 0 ... 2 | 3 ... 130 | Enabled | Inactive | | Empty |
| 2 | 131 | Enabled | Active | 8 | DMAC 01:80:C2:00:00:01 → Trap |
| 2 | 132 | Enabled | Active | 10 | DIP 1.x.x.x → Permit |
| 2 ... 5 | 133 ... 381 | Enabled | Inactive | | Empty |
| 5 | 382 | Enabled | Active | 11 | DIP 1.2.x.x → Redirect Port 4 |
| 5 | 383 | Enabled | Active | 11 | DIP 7.8.x.x → Redirect Port 3 |
| 6 | 384 | Enabled | Inactive | | Empty |
| 6 | 385 | Enabled | Active | 11 | DIP 1.2.x.x. → Redirect Port 4 |
| 6 | 386 | Enabled | Active | 11 | DIP 7.8.x.x. → Redirect Port 3 |
| 6 | 387 | Enabled | Active | 15 | DIP 7.8.x.x. + UDP → Redirect Port 2 |
| 6 | 388 | Enabled | Active | 20 | DIP 7.8.9.x → Flood |
| 6 | 389 | Enabled | Active | 21 | DIP 7.8.9.10 → Drop |
| 6 | 390 | Enabled | Active | 25 | Checksum Error → Trap |
| 6 | 391 | Enabled | Inactive | | Empty |
| 6 | 392 | Enabled | Active | 25 | Checksum Error → Trap |
| 7 ... 15 | 393 ... 1023 | Enabled | Inactive | | Empty |

Fig. 3

ACL TABLE 200

| CHUNK | ROW | CHUNK STATE | ROW STATE | PRECEDENCE | CONDITION → ACTION |
|---|---|---|---|---|---|
| 0 | 0 | Enabled | Active | 0 | DIP 0.0.0.0/0.0.0.0 → Trap |
| 0 | 1 | Enabled | Inactive | | Empty |
| 0 | 2 | Enabled | Active | 5 | DMAC 01:80:C2:XX:XX:XX → Drop |
| 0 ... 2 | 3 ... 130 | Enabled | Inactive | | Empty |
| 2 | 131 | Enabled | Active | 8 | DMAC 01:80:C2:00:00:01 → Trap |
| 2 | 132 | Enabled | Active | 10 | DIP 1.x.x.x → Permit |
| 2 ... 5 | 133 ... 381 | Enabled | Inactive | | Empty |
| 5 | 382 | Enabled | Active | 11 | DIP 1.2.x.x → Redirect Port 4 |
| 5 | 383 | Enabled | Active | 11 | DIP 7.8.x.x → Redirect Port 3 |
| 6 | 384 ... 386 | Enabled | Active | | Empty |
| 6 | 387 | Enabled | Active | 15 | DIP 7.8.x.x. + UDP → Redirect Port 2 |
| 6 | 388 | Enabled | Active | 20 | DIP 7.8.9.x → Flood |
| 6 | 389 | Enabled | Active | 21 | DIP 7.8.9.10 → Drop |
| 6 | 390 ... 391 | Enabled | Inactive | | Empty |
| 6 | 392 | Enabled | Active | 25 | Checksum Error → Trap |
| 7 ... 15 | 393 ... 1023 | Enabled | Inactive | | Empty |

PRECEDENCE →

*Fig. 4*

PRECEDENCE →

ACL TABLE 200

| CHUNK | ROW | CHUNK STATE | ROW STATE | PRECEDENCE | CONDITION → ACTION |
|---|---|---|---|---|---|
| 0 | 0 | Enabled | Active | 0 | DIP 0.0.0.0/0.0.0.0 → Trap |
| 0 | 1 | Enabled | Inactive | | Empty |
| 0 | 2 | Enabled | Active | 5 | DMAC 01:80:C2:XX:XX:XX → Drop |
| 0 ... 2 | 3 ... 130 | Enabled | Inactive | | Empty |
| 2 | 131 | Enabled | Active | 8 | DMAC 01:80:C2:00:00:01 → Trap |
| 2 | 132 | Enabled | Active | 10 | DIP 1.x.x.x → Permit |
| 2 ... 5 | 133 ... 381 | Enabled | Inactive | | Empty |
| 5 | 382 | Enabled | Active | 11 | DIP 1.2.x.x → Redirect Port 4 |
| 5 | 383 | Enabled | Active | 11 | DIP 7.8.x.x. → Redirect Port 3 |
| 6 | 384 | Enabled | Inactive | 12 | DIP 1.x.x.x → Permit + Count |
| 6 | 385 | Enabled | Inactive | 13 | DIP 1.2.x.x. → Drop + Count |
| 6 | 386 | Enabled | Inactive | 13 | DIP 7.8.x.x. → Drop + Count |
| 6 | 387 | Enabled | Active | 15 | DIP 7.8.x.x. + UDP → Redirect Port 2 |
| 6 | 388 | Enabled | Active | 20 | DIP 7.8.9.x → Flood |
| 6 | 389 | Enabled | Active | 21 | DIP 7.8.9.10 → Drop |
| 6 | 390 | Enabled | Inactive | 22 | DIP 7.8.9.x. → Drop |
| 6 | 391 | Enabled | Inactive | 23 | DIP 7.8.9.200 → Permit |
| 6 | 392 | Enabled | Active | 25 | Checksum Error → Trap |
| 7 ... 15 | 393 ... 1023 | Enabled | Inactive | | Empty |

Fig. 5

ACL TABLE 200

| CHUNK | ROW | CHUNK STATE | ROW STATE | PRECEDENCE | CONDITION → ACTION |
|---|---|---|---|---|---|
| 0 | 0 | Enabled | Active | 0 | DIP 0.0.0.0/0.0.0.0 → Trap |
| 0 | 1 | Enabled | Inactive | | Empty |
| 0 | 2 | Enabled | Active | 5 | DMAC 01:80:C2:XX:XX:XX → Drop |
| 0 | 3 | Enabled | Active | 8 | DMAC 01:80:C2:00:00:01 → Trap |
| 0 ... 2 | 3 ... 131 | Enabled | Inactive | | Empty |
| 2 | 132 | Enabled | Active | 10 | DIP 1.x.x.x → Permit |
| 2 ... 5 | 133 ... 381 | Enabled | Inactive | | Empty |
| 5 | 382 | Enabled | Active | 11 | DIP 1.2.x.x → Redirect Port 4 |
| 5 | 383 | Enabled | Active | 11 | DIP 7.8.x.x. → Redirect Port 3 |
| 6 | 384 | Enabled | Inactive | 12 | DIP 1.x.x.x. → Permit + Count |
| 6 | 385 | Enabled | Inactive | 13 | DIP 1.2.x.x. → Drop + Count |
| 6 | 386 | Enabled | Inactive | 13 | DIP 7.8.x.x. → Drop + Count |
| 6 | 387 ... 447 | Enabled | Inactive | | Empty |
| 7 | 448 | Enabled | Active | 15 | DIP 7.8.x.x + UDP → Redirect Port 2 |
| 7 | 449 ... 511 | Enabled | Inactive | | Empty |
| 8 | 512 | Enabled | Active | 20 | DIP 7.8.9.x → Flood |
| 8 | 513 | Enabled | Active | 21 | DIP 7.8.9.x → Drop |
| 8 | 514 ... 575 | Enabled | Inactive | | Empty |
| 9 | 576 | Enabled | Inactive | 22 | 7.8.9.x → Drop |
| 9 | 577 | Enabled | Inactive | 23 | DIP 7.8.9.200 → Permit |
| 9 | 578 ... 639 | Enabled | Inactive | | Empty |
| 10 | 640 | Enabled | Active | 25 | Checksum Error → Trap |
| 10 ... 15 | 641 ... 1023 | Enabled | Inactive | | Empty |

PRECEDENCE →

*Fig. 6a*

ACL TABLE 200

| CHUNK | ROW | CHUNK STATE | ROW STATE | PRECEDENCE | CONDITION → ACTION |
|---|---|---|---|---|---|
| 0 | 0 | Enabled | Active | 0 | DIP 0.0.0.0/0.0.0.0 → Trap |
| 0 | 1 | Enabled | Inactive | | Empty |
| 0 | 2 | Enabled | Active | 5 | DMAC 01:80:C2:XX:XX:XX → Drop |
| 0 | 3 | Enabled | Active | 8 | DMAC 01:80:C2:00:00:01 → Trap |
| 0 ... 2 | 3 ... 131 | Enabled | Inactive | | Empty |
| 2 | 132 | Enabled | Active | 10 | DIP 1.x.x.x → Permit |
| 2 ... 5 | 133 ... 381 | Enabled | Inactive | | Empty |
| 5 | 382 | Enabled | Active | 11 | DIP 1.2.x.x → Redirect Port 4 |
| 5 | 383 | Enabled | Active | 11 | DIP 7.8.x.x. → Redirect Port 3 |
| 6 | 384 | Disabled | Active | 12 | DIP 1.x.x.x. → Permit + Count |
| 6 | 385 | Disabled | Active | 13 | DIP 1.2.x.x. → Drop + Count |
| 6 | 386 | Disabled | Active | 13 | DIP 7.8.x.x. → Drop + Count |
| 6 | 387 ... 447 | Disabled | Inactive | | Empty |
| 7 | 448 | Enabled | Active | 15 | DIP 7.8.x.x + UDP → Redirect Port 2 |
| 7 | 449 ... 511 | Enabled | Inactive | | Empty |
| 8 | 512 | Enabled | Active | 20 | DIP 7.8.9.x → Flood |
| 8 | 513 | Enabled | Active | 21 | DIP 7.8.9.10 → Drop |
| 8 | 514 ... 575 | Enabled | Inactive | | Empty |
| 9 | 576 | Disabled | Active | 22 | 7.8.9.x → Drop |
| 9 | 577 | Disabled | Active | 23 | DIP 7.8.9.200 → Permit |
| 9 | 578 ... 639 | Disabled | Inactive | | Empty |
| 10 | 640 | Enabled | Active | 25 | Checksum Error → Trap |
| 10 ... 15 | 641 ... 1023 | Enabled | Inactive | | Empty |

PRECEDENCE →

*Fig. 6b*

ACL TABLE 200

| CHUNK | ROW | CHUNK STATE | ROW STATE | PRECEDENCE | CONDITION → ACTION |
|---|---|---|---|---|---|
| 0 | 0 | Enabled | Active | 0 | DIP 0.0.0.0/0.0.0.0 → Trap |
| 0 | 1 | Enabled | Inactive | | Empty |
| 0 | 2 | Enabled | Active | 5 | DMAC 01:80:C2:XX:XX:XX → Drop |
| 0 | 3 | Enabled | Active | 8 | DMAC 01:80:C2:00:00:01 → Trap |
| 0 | 3 … 127 | Enabled | Inactive | | Empty |
| 2 | 132 | Disabled | Active | 10 | DIP 1.x.x.x → Permit |
| 3 … 5 | 192 … 381 | Disabled | Inactive | | Empty |
| 5 | 382 | Disabled | Active | 11 | DIP 1.2.x.x → Redirect Port 4 |
| 5 | 383 | Disabled | Active | 11 | DIP 7.8.x.x. → Redirect Port 3 |
| 6 | 384 | Enabled | Inactive | 12 | DIP 1.x.x.x. → Permit + Count |
| 6 | 385 | Enabled | Inactive | 13 | DIP 1.2.x.x. → Drop + Count |
| 6 | 386 | Enabled | Inactive | 13 | DIP 7.8.x.x. → Drop + Count |
| 6 | 387 … 447 | Enabled | Active | 15 | DIP 7.8.x.x + UDP → Redirect Port 2 |
| 7 | 448 | Enabled | Inactive | | Empty |
| 7 | 449 … 511 | Enabled | Active | 20 | DIP 7.8.9.x → Flood |
| 8 | 512 | Disabled | Active | 21 | DIP 7.8.9.10 → Drop |
| 8 | 513 | Disabled | Inactive | | Empty |
| 8 | 514 … 575 | Disabled | Inactive | 22 | 7.8.9.x → Drop |
| 9 | 576 | Enabled | Inactive | 23 | DIP 7.8.9.200 → Permit |
| 9 | 577 | Enabled | Inactive | | Empty |
| 9 | 578 … 639 | Enabled | Active | 25 | Checksum Error → Trap |
| 10 | 640 | Enabled | Active | | Empty |
| 10 … 15 | 641 … 1023 | Enabled | Inactive | | |

PRECEDENCE →

*Fig. 6c*

ACL TABLE 200

PRECEDENCE →

| CHUNK | ROW | CHUNK STATE | ROW STATE | PRECEDENCE | CONDITION → ACTION |
|---|---|---|---|---|---|
| 0 | 0 | Enabled | Active | 0 | DIP 0.0.0.0/0.0.0.0 → Trap |
| 0 | 1 | Enabled | Inactive | | Empty |
| 0 | 2 | Enabled | Active | 5 | DMAC 01:80:C2:XX:XX:XX → Drop |
| 0 | 3 | Enabled | Active | 8 | DMAC 01:80:C2:00:00:01 → Trap |
| 0 … 5 | 3 … 383 | Enabled | Inactive | | Empty |
| 6 | 384 | Enabled | Active | 12 | DIP 1.x.x.x → Permit + Count |
| 6 | 385 | Enabled | Active | 13 | DIP 1.2.x.x → Permit + Count |
| 6 | 386 | Enabled | Active | 13 | DIP 7.8.x.x → Drop + Count |
| 6 | 387 … 447 | Enabled | Inactive | | Empty |
| 7 | 448 | Enabled | Active | 15 | DIP 7.8.x.x. → Redirect Port 2 |
| 7 … 8 | 449 … 575 | Enabled | Inactive | | Empty |
| 9 | 576 | Enabled | Active | 22 | DIP 7.8.9.X → Drop |
| 9 | 577 | Enabled | Active | 23 | DIP 7.8.9.200 → Permit |
| 10 | 640 | Enabled | Active | 25 | Checksum Error → Trap |
| 10 … 15 | 641 … 1023 | Enabled | Inactive | | Empty |

*Fig. 7* ures of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.
ATOMIC UPDATE OF ACCESS CONTROL LIST RULES

FIELD OF THE SPECIFICATION

This disclosure relates in general to the field of network fabrics, and more particularly, though not exclusively, to a system and method for providing atomic update of access control list rules.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 2-7 provide access control list (ACL) tables illustrating an atomic update operation, according to one or more examples of the present specification.

EMBODIMENTS OF THE DISCLOSURE

Figure 1A:
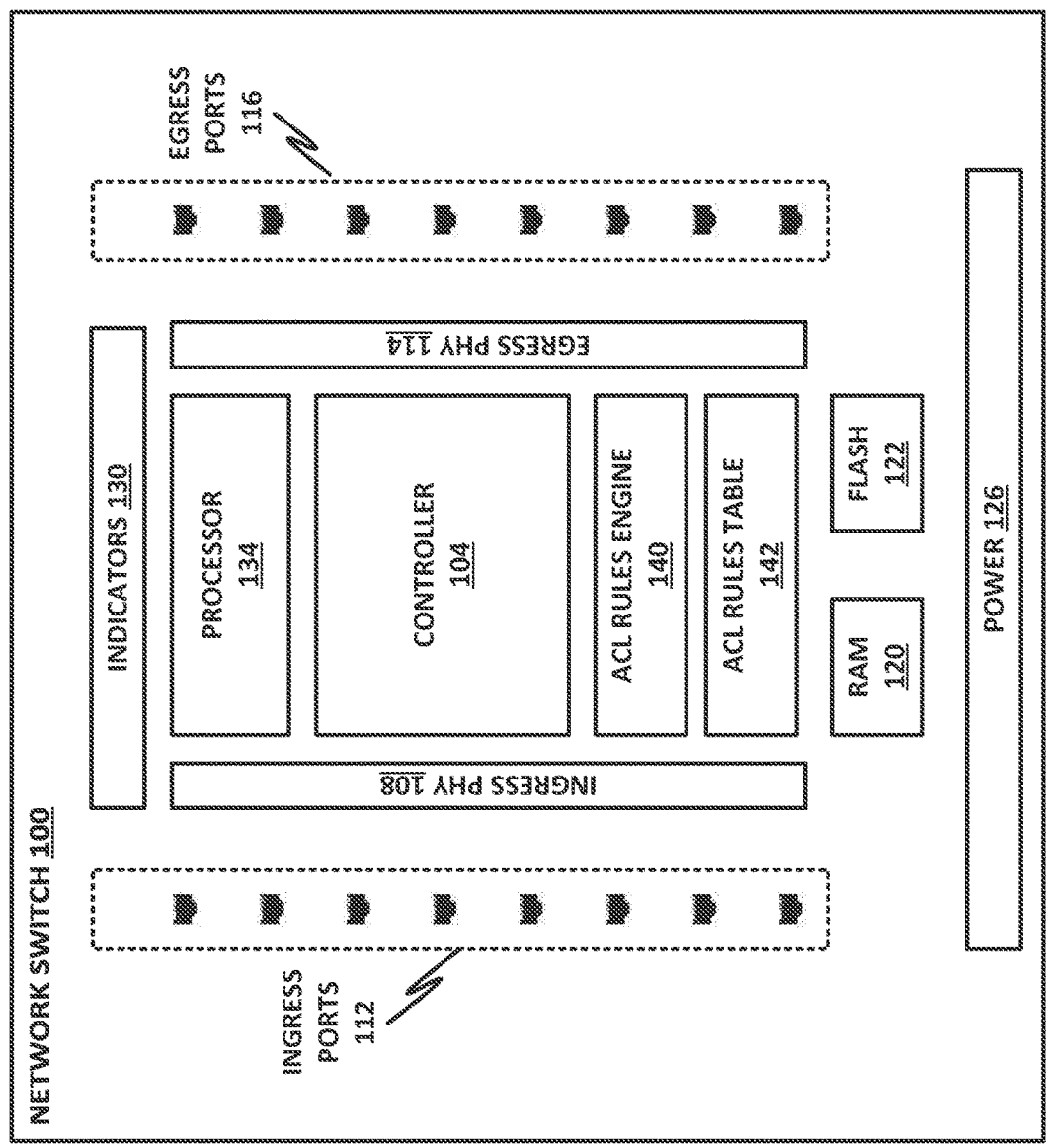
FIGS. 1a and 1b are block diagrams of a network switch, including switching elements and a controller with a ternary content-addressable memory (TCAM) configuration register, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

In embodiments of the present disclosure, a VM is an isolated partition within a computing device that allows usage of an operating system and other applications, independent of other programs on the device in which it is contained. VMs, containers, and similar may be generically referred to as "guest" systems.

As used in the present specification, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), ARM processors, or IBM PowerPC and Power ISA processors, to name just a few.

A typical data center or other network environment includes a network fabric, which may include a number of switches or other network elements that direct packets through the network. In this specification, an Ethernet switch is used as an example of such a network element, but this should be understood to be a nonlimiting example, and the Ethernet switch described herein should be understood to stand for the entire class of network elements that may be configured to provide the atomic update of ACL rules, as described in this specification.

A data center may require Ethernet switches to process large volumes of flow, route, and other table updates. Access control lists (ACLs) are commonly used match-action constructs in such Ethernet switches. ACLs support flow management, routing protocols, and other use cases requiring wire speed packet classification. In other words, the ACL must operate very quickly so as not to become a bottleneck in the network fabric.

Many functionalities require multiple ACLs to be present in the system, including use cases based on wild-carded keys or ranges of keys. Operational requirements or practical considerations may drive a requirement that ACL updates be performed non-disruptively, even when groups of ACL rules are updated at the same time. Thus, the present specification provides a system and method of atomic update of ACL rules without disruption to traffic flows.

An illustrative example of such a situation is a group of ACL rules that match on an IP range, such as 1.2.3.10 through 1.2.3.15, with a drop action. Notably, the range of this rule does not fall on a power of two boundary. In other words, if the matching range were 1.2.3.0 through 1.2.3.15, the rule could be handled with a 4-bit bit mask, e.g., by matching 1.2.3.0/28. This bit mask would match every rule in the 1.2.3.0 through 1.2.3.15 range. But because the desired range does not fall cleanly within that bit mask, six individual rules are required to cover the individual values. For example:
1. Precedence 10 Rule Match 1.2.3.10→Drop
2. Precedence 10 Rule Match 1.2.3.11→Drop
3. Precedence 10 Rule Match 1.2.3.12→Drop
4. Precedence 10 Rule Match 1.2.3.13→Drop
5. Precedence 10 Rule Match 1.2.3.14→Drop
6. Precedence 10 Rule Match 1.2.3.15→Drop Now consider a case where this group of rules is to be updated to redirect the frames to a port instead of dropping them. If the changes are made to all six rules serially, then while the changes are being propagated, some frames within the range will be directed to the output port, while others will be dropped. This is undesirable behavior.

Some existing fabric switches use a mapper to remap multiple values to a single value and have a single entry in the ACL table that matches on the remapped value. For example:
Mapper Entries
1. Mapper entry 0 Match 1.2.3.10→Mapped Entry 1
2. Mapper entry 1 Match 1.2.3.11→Mapped Entry 1
3. Mapper entry 2 Match 1.2.3.12→Mapped Entry 1
4. Mapper entry 3 Match 1.2.3.13→Mapped Entry 1
5. Mapper entry 4 Match 1.2.3.14→Mapped Entry 1
6. Mapper entry 5 Match 1.2.3.15→Mapped Entry 1

The ACL entry that corresponds to this mapping would be: Precedence 10 Rules Match Mapped Entry 1→Drop This solution is however limited to applications where a mapper is exposed. The solution also does not scale well because the number of mapper entries is generally limited. Furthermore, this solution only works for range matching. Thus, if the preceding rules were modified so that 1.2.3.15 is forwarded to a port while 1.2.3.16 is dropped, existing mappers could not handle this as a mapped rule.

Thus, to achieve true atomic updates, a policy may be enforced on the switch by making sure that packets that ingress the pipeline match on the original configuration or the desired modified configuration, but none of the intermediate configurations. This can be achieved, for example, by stopping the pipeline processing of incoming frames. ACL table entries are then updated, and only once the table entries are all updated does the pipeline resume processing of incoming frames.

While this solution results in atomic updates, it is disruptive to the pipeline because incoming frames are not processed while the ACLs are being modified. This can lead to packet loss and high jitter. Furthermore, this solution works only when the underlying hardware is able to apply the register modification at a fast pace. Potentially advantageously, the system and method of the present specification provides an atomic update of ACL rules that is scalable so that the number of groups supported is not limited by anything other than the available size of the table. This solution is also not limited to range matching, and it can be used to atomically enable or disable an arbitrary group of rules.

The method includes copying or moving rules in a non-disruptive way to specified positions within the ACL table identified as discrete chunks. The transition is optimized to lowering register operation as much as possible.

By way of example, the present specification provides ACLs supported by a TCAM-based network switch. Individual TCAM entries can be updated atomically with individual activate and deactivate operations. The TCAM itself is divided up into discrete "chunks," and chunks can be enabled and disabled simultaneously. For example, a TCAM may divide its table into 16 discrete chunks, with each chunk including 64 rules, or rows. Thus, the TCAM supports a total of 1024 total rules. The TCAM chunks can be controlled atomically by a TCAM configuration register, or by other configuration signals that can be sent on a bus in parallel. Chunks that receive an enable (e.g., a 1) are enabled, while chunks that receive a disable (e.g., 0) are disabled. Because all 16 chunks in the TCAM can be simultaneously enabled or disabled according to the configuration of the TCAM register, and because rules can be individually enabled and disabled, atomic ACL updates can be effectively realized.

Further note that in the following examples, higher index TCAM entries have higher precedence in the case of multiple hits. For example, a rule with priority 12 that matches 1.2.3.x will be processed before a rule with priority 10 that matches 1.2.x.x. Thus, a more specific rule can be processed before a more general rule by giving the more specific rule a higher priority number.

By way of illustration, atomic ACL updates can be realized as follows.

First, new entries are added with updated conditions and/or actions, and are designated as inactive when added. Because these rules are inactive when added, they will not be processed during the update operation.

Once the updated inactive rules are added, entries are moved in the TCAM according to the following criteria:
 a. Entries that are not to be changed (i.e., "untouched entries") should reside on a chunk that does not include any original source entries or their updated variance.
 b. Source entries should be located on exclusive chunks with respect to the entries' sorting order.
 c. New entries should be located on an exclusive chunk with respect to the entries' sorting order.

Once the new inactive entries have been added and entries have been moved to appropriate chunks, the chunk hosting the new entries may be disabled. Now that the chunk is disabled, the entries within the chunk can be activated at the physical row level without them affecting actual routing. In other words, the entries are individually marked as active, but because they reside on a disabled chunk, they have no effect on the routing.

Once all of the new entries on the disabled chunk have been enabled, then the chunk with the new entries is enabled, while simultaneously the chunk with the source entries (i.e., the old entries that were updated) is disabled. Because the entire TCAM is controlled on a chunk-by-chunk basis by a single register or bus, the enabling and disabling of chunks can be performed atomically.

The TCAM now operates according to the desired update. The new rules reside on the newly activated chunk, and are active, while the old rules reside on the now deactivated chunk, and thus are not processed whether they are active or inactive.

Although the TCAM is now operating according to the atomic update, and is routing traffic appropriately, it also has one or more chunks that have been disabled to realize the atomic update operation. To recapture these chunks, the old entries can be marked as inactive or empty, or otherwise removed from active service, and the disabled chunk or chunks can then be re-enabled.

FIGS. 2-7 below illustrate an operation of an atomic ACL update. Those FIGURES should be understood to provide a nonlimiting and illustrative example only. The illustrated example includes five rules being updated atomically in a table that contains a total of ten various entries. These entries have different precedences, and are located in different places throughout the TCAM. Advantageously, the precedence of the rules is respected during the transition. New precedence is created to insert new rules that carry the updated conditions and/or actions. The illustrated TCAM provides a table with a size of 1024 rows divided into 16 chunks with 64 rules in each chunk. It should be noted that these examples are illustrative only, and other table sizes and chunk sizes are possible. Furthermore, while in this example each chunk has an identical size of 64 rules, this is also a nonlimiting example. In other cases, a table may be divided into chunks of non-uniform size.

As illustrated here, the precedence of a rule is a software abstraction that actually defines the precedence of a rule with respect to the other rules in the table. Rules can share the same precedence group if the position of the rule inside the group is not important. For example, if it is not important which rule of precedence 10 is processed first, then a plurality of rules can be assigned precedence 10. However, if it is necessary for a rule to be processed before precedence 10 (e.g., the precedence 10 rule is more general), then the second rule can be provided with a higher precedence, such as precedence 12.

In the illustrated example, the source entries including destination IP addresses (DIPs) are as follows:
1. Precedence 10 Rule Match DIP 1.x.x.x→Permit
2. Precedence 11 Rule Match DIP 1.2.x.x→Redirect Port 4
3. Precedence 11 Rule Match DIP 7.8.x.x→Redirect Port 3
4. Precedence 20 Rule Match DIP 7.8.9.x→Flood
5. Precedence 21 Rule Match DIP 7.8.9.10→Drop In this case, the precedence 21 rule will be processed first, the precedence 20 rule will be processed next, the two precedence 11 rules will be processed next (in any order), and the precedence 10 rule will be processed last. Note that the table may also include other rules of other precedences. In a common TCAM, rules of higher precedence must be located at higher addresses of the TCAM than rules of lower precedence. This enables the TCAM content to be searched in a top-down fashion, starting at the highest address, and moving to the lowest. Thus, precedence 21 rules must reside on a higher row number than precedence 20 rules, precedence 20 rules must reside on a higher row number than precedence 11 rules, the precedence 11 rules can reside in a row or rows that match their precedence, but the precedence 11 rules must both reside on rows with higher row numbers than the precedence 10 rule. The rules above are to be updated as follows:
1. Precedence 12 Rule Match DIP 1.x.x.x→Permit+Count
2. Precedence 13 Rule Match DIP 1.2.x.x→Drop+Count
3. Precedence 13 Rule Match DIP 7.8.x.x→Drop+Count
4. Precedence 22 Rule Match DIP 7.8.9.x→Drop
5. Precedence 23 Rule Match DIP 7.8.9.200→Permit To highlight the changes to be made, rule 1 is to be modified by adding a count action. Rule 2 is to be modified by changing its action to drop+count. Rule 3 is to be modified by changing its action to drop+count. Rule 4 is to be modified by changing its action from flood to drop. Rule 5 is to be modified by changing the DIP from 7.8.9.10 to 7.8.9.200, and by modifying the rule from drop to permit. This can be accomplished atomically according to the method discussed above.

A system and method for providing atomic update of access control list rules will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 1B:
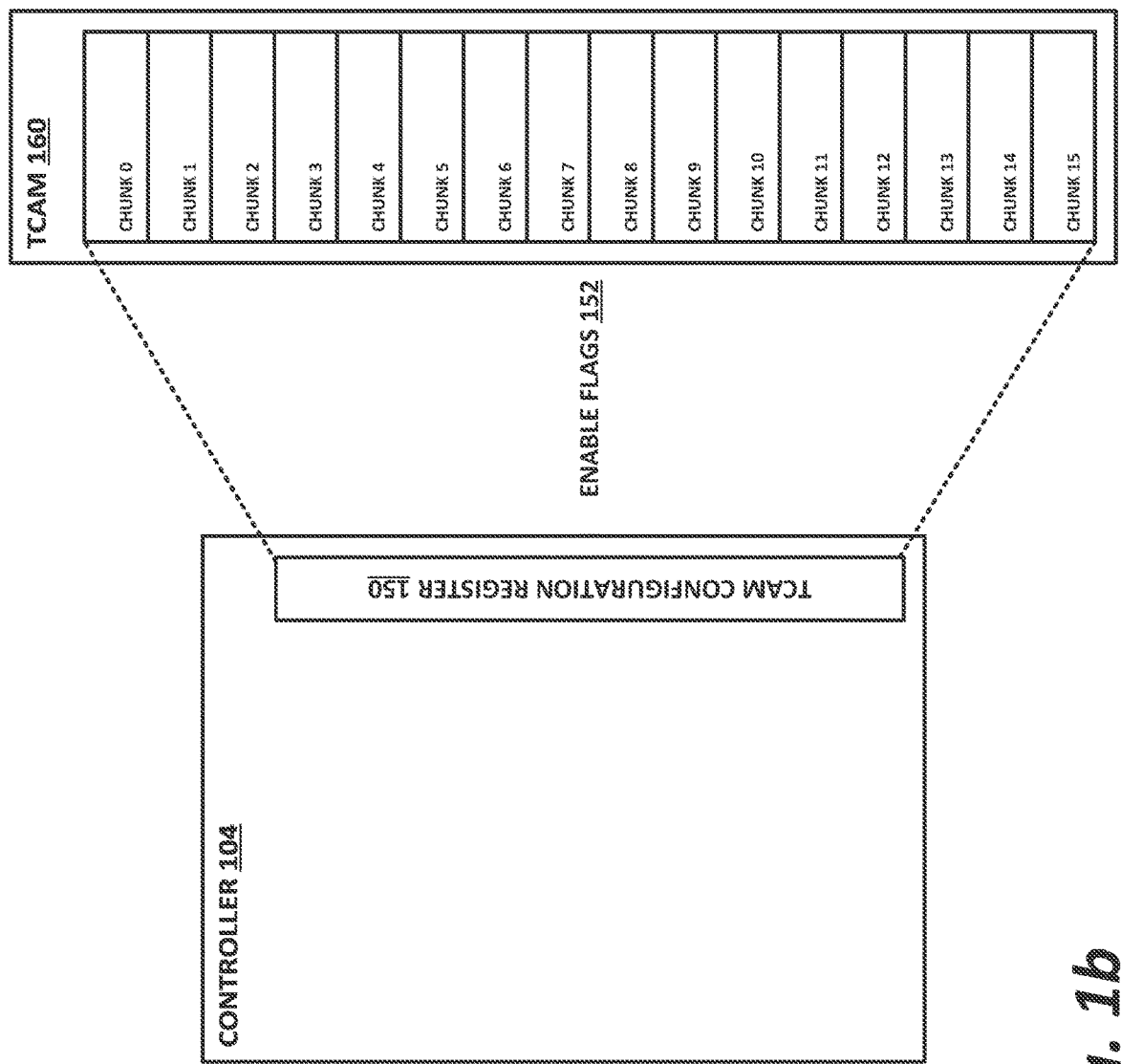

FIGS. 1a and 1b are block diagrams of a network switch, including switching elements and a controller 104 with a ternary content-addressable memory (TCAM) configuration register, according to one or more examples of the present specification.

In the example of FIG. 1a, network switch 100 includes a plurality of ingress ports 112 serviced by a plurality of ingress physical layers (PHYs) 108. Network switch 100 also provides a plurality of egress ports 116 serviced by a plurality of egress PHYs 114. A controller 104 provides switching logic or a switching circuit to direct traffic from ingress ports 112 to egress ports 116. Processor 134 may include software to configure controller 104 and to modify ACL rules table 142. ACL rules engine 140 may be part of controller 104, or may be a separate circuit such as an application-specific integrated circuit (ASIC), or may be part of a system-on-a-chip. ACL rules engine 140 uses ACL rules table 142 to make decisions about switching traffic from ingress ports 112 to egress ports 116. In some embodiments, processor 134, controller 104, ACL rules engine 140, and ACL rules table 142 may all be part of a single system-on-a-chip. Controller 104 may also include random access memory 120, with non-transitory instructions stored on a flash 122. Switch 100 is powered by a power circuit 126. In some cases, indicators 130 such as LEDs or other human-visible indicators may be used to provide status information at a glance.

In practice, some packets at ingress ports 112 may be deterministically switched to an egress port 116, such as in the case where only a single route is provided for that packet. But in many practical cases, a plurality of egress ports 116 provides a plurality of equally valid routes for a packet arriving at ingress ports 112.

In the example of FIG. 1b, controller 104 may include a TCAM configuration register 150. TCAM configuration register 150 can be used to atomically enable or disable chunks of a TCAM 160. TCAM 160 may be, for example, part of ACL rules table 142. In this example, TCAM 160 includes chunks 0 through 15. Each chunk includes 64 entries for a total of 1024 entries in TCAM 160. Note that other sizes of TCAMs and chunks are possible.

TCAM configuration register 150 includes enable flags 152. For example, TCAM configuration register 150 may include a 16-bit field, with each bit flag representing enable or disable for a chunk of TCAM 160. Thus, a single value can be written to TCAM configuration register 150, and all of the chunks within TCAM 160 can be simultaneously updated to an enable or disable status.

FIGS. 2-7 provide ACL tables illustrating an atomic update operation, according to one or more examples of the present specification. ACL table 200 includes one or more ACL tables having a plurality of chunks that can be simultaneously enabled or disabled.

Turning to FIG. 2, an ACL table 200 is illustrated. ACL table 200 may be hosted, for example, within TCAM 160 of FIG. 1b. ACL table 200 includes a number of rows, which may be numbered 0 through 1023, with a state of either active or inactive assigned to each row. Each row also includes a precedence, which increases as the row number increases. Finally, ACL table 200 includes a condition and action mapping, which illustrates the condition to match to the entry, and an action to take for each condition. Also identified in ACL table 200 is the chunk to which each row belongs, as well as the state of each chunk per-entry.

As discussed in the description above, five of these rules are to be atomically updated. Namely, row 132 with precedence 10 is to be changed from match DIP 1.x.x.x→permit to precedence 12 match DIP 1.x.x.x→permit+count.

Row 385 precedence 11 match DIP 1.2.x.x→redirect port 4 is to be changed to precedence 13 match DIP 1.2.x.x→drop+count.

Row 386 precedence 11 match DIP 7.8.x.x→redirect port 3 is to be changed to precedence 13 match DIP 7.8.x.x→drop+count.

Row 388 precedence 20 is to be changed from match DIP 7.8.9.x→flood to precedence 22 match DIP 7.8.9.x→drop.

Row 389 precedence 21 is to be changed from match DIP 7.8.9.10→drop to precedence 23 match DIP 7.8.9.200→permit.

Turning now to FIG. 3, ACL table 200 is updated with new inactive entries that reflect the updated rules. But first, space must be freed up to add new entries with precedence 12 and 13 and new entries with precedence 22 and 23. Thus, two new rules are added at rows 382 and 383. Because these rules have the exact same match condition and the same action, and are of the same precedence, they will have no effect on routing performed by the network switch. Note that the two new rules have been added to chunk 5, while the two original rules at row 385 and 386 are within chunk 6. To make room for rules with precedence 22 and 23, a copy of the former row 390 is made and placed in row 392.

Turning now to FIG. 4, the rules in rows 384, 385, and 390 are now superfluous. These rules can therefore be deleted without affecting routing. There is now once again one copy of each rule, but there is now space to add entries with precedence 12, 13, 22, and 23. Note that at this point, no actual changes have been made in the routing behavior. Entries have simply been moved to create room for the new entries.

Turning now to FIG. 5, new rows 384, 385, 386, 390, and 391 are added to the table. Specifically, new row 384 is added with status inactive. Row 384 has the updated match and action of DIP 1.x.x.x→permit+count. Row 385 has the updated condition+action of DIP 1.2.x.x→drop+count, row 386 has the new match+count of DIP 7.8.x.x→drop+count, row 390 has the new condition+action of DIP 7.8.9.x→drop, and row 391 has the new condition+action of DIP 7.8.9.200→permit. Note that each of these rules has also been assigned the correct updated precedence. Row 384 has precedence 12, row 385 has precedence 13, row 386 has precedence 13, row 390 has precedence 22, and row 391 has precedence 23. Also note that, in FIG. 5, the new inactive rules have been grouped conveniently into a single chunk, which can be atomically enabled or disabled.

Turning now to FIGS. 6a-6c, entries may now be moved so that the original active entries all reside on separate chunks from the new inactive entries. This is to ensure that the new entries can be activated while the old entries are simultaneously inactivated. Entries may be moved according to the following rules:

Untouched or unmodified entries should reside on a chunk that does not include either an original source entry or a new or updated entry.

Original source entries should be located on exclusive chunks, with regard to those entries' sorting order. For example, in FIG. 6a, row 132 resides on chunk 2, and because this rule is to be deactivated, no other active rules should be located on chunk 2. For simplicity of the drawing, only row 132 of Chunk 2 is shown. Chunk 2 also includes rows 128-131, and 133-191, which may, for example, be empty and inactive. Rows 382 and 383 reside on chunk 5. Because these are old entries that are to be deactivated, no other entries should reside on chunk 5.

Further illustrated in FIG. 6a, rows 512 and 513 reside on chunk 8, and because these rules will be atomically deactivated, no other rules should reside on chunk 8. Rows 512 and 513 cannot be grouped onto chunk 5 with rows 382 and 383, because this would place them out-of-order with respect to rows 384 through 386, which have precedences 12 and 13.

In FIG. 6b, ACL table 200 is now arranged so that all of the old rules ("source entries") are grouped onto chunks with no other entries. New entries are also grouped onto exclusive chunks with no other entries. These chunks are selected and sorted so that an atomic operation that simultaneously activates and deactivates chunks will result in an immediate switch from the old policy to the new policy without any disruption.

As illustrated in FIG. 6c, the old rules and the new rules have been sorted into dedicated chunks, and now the new rules can be activated. Note that activating rows 384, 385, 386, 576, and 577 will have no effect on the current routing of the switch, because chunks 6 and 9 are currently inactive. It may be necessary to maintain these chunks in their disabled state, because individual rows cannot be activated and deactivated atomically the way that chunks can be atomically enabled and disabled. Once rows 384, 385, 386, 576, and 577 have finished being activated, the processor can operate the TCAM configuration register to simultaneously enable chunks 6 and 9, while disabling chunks 2, 5, and 8. Once those chunks have been atomically enabled and disabled, the switch begins operating according to the updated policy as desired. However, there are now superfluous entries in ACL table 200. Furthermore, the deactivated chunks are not available for use in rules. It is therefore desirable to clear rows 132, 382, 383, and 513 so that chunks 2, 5, and 8 can be re-enabled without affecting the operation of the switch.

This result is reflected in FIG. 7, where the five entries have been updated, and all chunks are now enabled.

Figure 8:
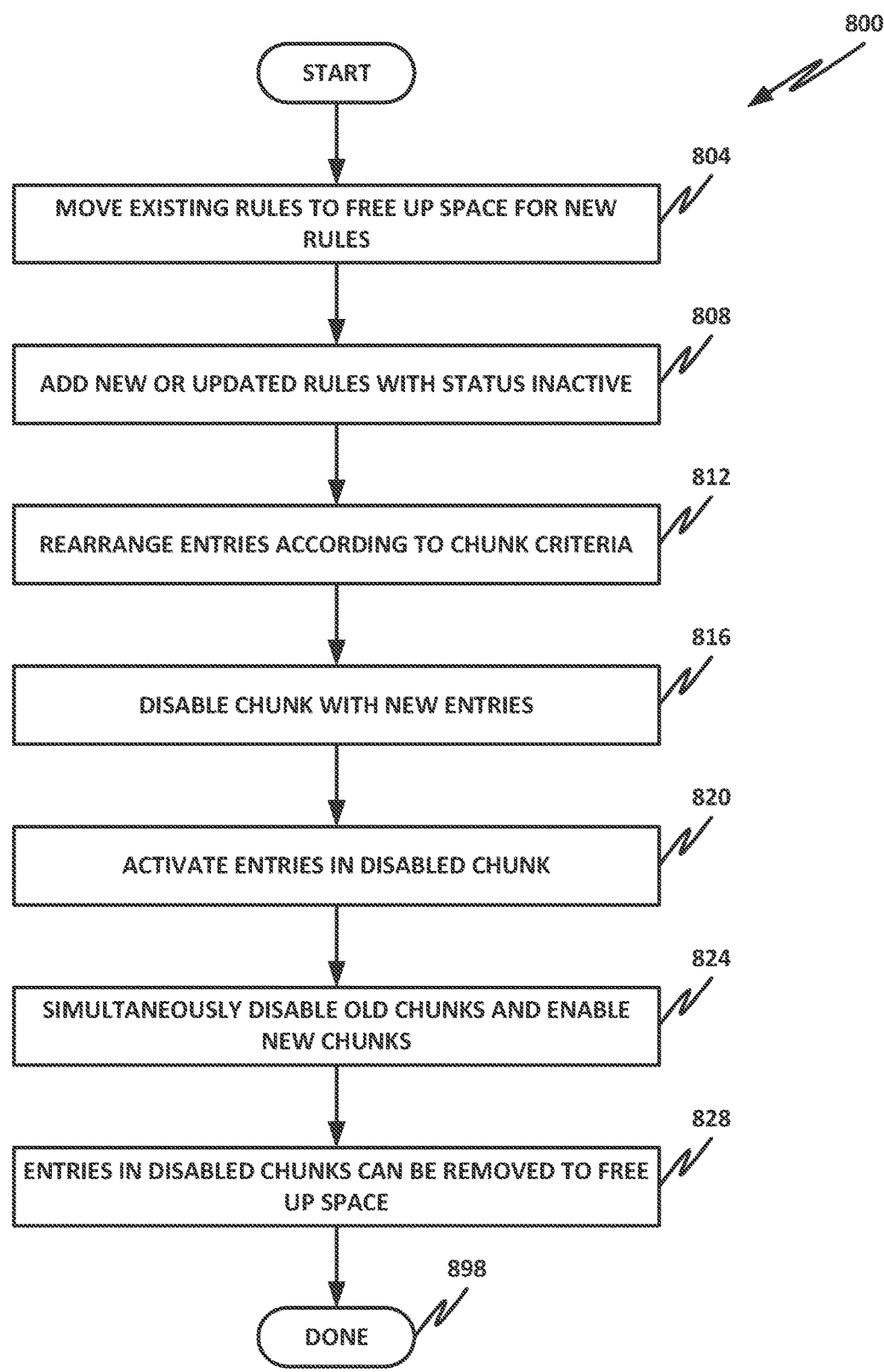
FIG. 8 is a flowchart of a method of providing atomic update of an ACL rule, according to one or more examples of the present specification.

FIG. 8 is a flowchart of a method of providing atomic update of an ACL rule, according to one or more examples of the present specification.

In block 804, existing rules may be moved to free up space for the new rules. This movement can include accounting for the precedence that new rules are to have, and to ensure that there is room to insert the new rules. As illustrated in FIG. 3, this can include creating duplicate rules with the same precedence as the original rules. This ensures that the new duplicate rules do not affect actual routing within the switch.

In block 808, new or updated rules are added to the table, and each is assigned the status of inactive. Again, the rules are inserted into the table without affecting routing because the rules are added as disabled. This is illustrated in FIG. 5, where the new and updated rules are added.

In block 812, the rules are rearranged according to the chunk criteria. This includes ensuring that untouched entries are part of a chunk that does not include any source entries or new or updated entries. Original or source entries are located on exclusive chunks selected with respect to the entry sorting order. New entries are also located on exclusive chunks selected with respect to the entry sorting order.

In block 816, the chunks that contain new or updated entries are disabled. This ensures that entries within those chunks can be operated on without affecting routing.

In block 820, the new and updated entries on the currently disabled chunks are each activated. Although they cannot be activated atomically, the piecewise activation of these entries does not result in changes to the routing, because the chunks that host them are disabled.

In block 824, chunks containing old entries and chunks containing new or updated entries are simultaneously disabled and enabled, respectively. This ensures that the update to the ACL table occurs atomically so that the switch is made from the old policy to the new policy without any intermediate routing.

In block 828, entries in disabled chunks can now be removed to free up space. The disabled chunks can then be re-enabled so that they are available for use in the ACL table. In block 898, the method is done.

Figure 9:
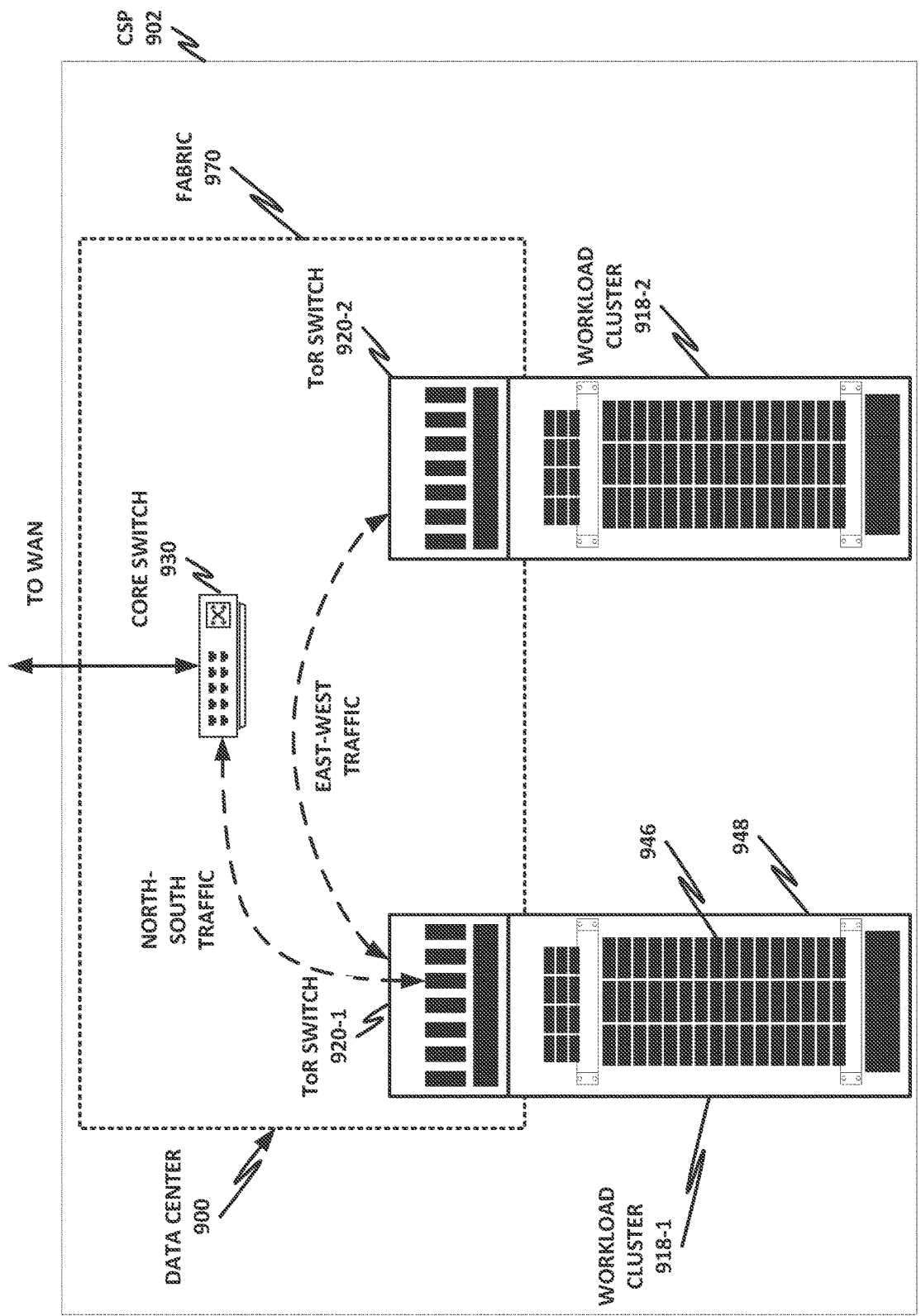
FIG. 9 is a block diagram of selected components of a data center with connectivity to a network of a cloud service provider (CSP), according to one or more examples of the present application.

FIG. 9 is a block diagram of selected components of a data center 900 with connectivity to a network of a cloud service provider (CSP) 902, according to one or more examples of the present specification. Embodiments of data center 900 disclosed herein may be adapted or configured to provide the method of atomic update of access control list rules, according to the teachings of the present specification.

CSP 902 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 902 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 902 may provision some number of workload clusters 918, which may be clusters of individual servers, blade servers, rackmount servers, or any other suitable server topology. In this illustrative example, two workload clusters, 918-1 and 918-2 are shown, each providing rackmount servers 946 in a chassis 948.

In this illustration, workload clusters 918 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 946 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 946 may be specifically dedicated to certain enterprise clients or tenants, while others may be shared.

The various devices in a data center may be connected to each other via a switching fabric 970, which may include one or more high speed routing and/or switching devices. Switching fabric 970 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 946 increases, traffic volume may further increase. For example, each server 946 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 970 may be provided. Switching fabric 970 is illustrated in this example as a "flat" network, wherein each server 946 may have a direct connection to a top-of-rack (ToR) switch 920 (e.g., a "star" configuration), and each ToR switch 920 may couple to a core switch 930. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 946 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 970. In other embodiments, the Ultra Path Interconnect (UPI) (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 920, and optical cabling provides relatively longer connections to core switch 930. Interconnect technologies that may be found in the data center include, by way of nonlimiting example, Intel® Omni-Path™ Architecture (OPA), TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in high-performance computing (HPC) applications, while Ethernet and FibreChannel are more popular in cloud data centers. But these examples are expressly nonlimiting, and as data centers evolve fabric technologies similarly evolve.

In embodiments of the present specification, cache coherency is a memory architecture that provides uniform sharing and mapping between a plurality of caches. For example, the caches may map to the same address space. If two different caches have cached the same address in the shared address space, a coherency agent provides logic (hardware and/or software) to ensure the compatibility and uniformity of shared resource. For example, if two caches have cached the same address, when the value stored in that address is updated in one cache, the coherency agent ensures that the change is propagated to the other cache. Coherency may be maintained, for example, via "snooping," wherein each cache monitors the address lines of each other cache, and detects updates. Cache coherency may also be maintained via a directory-based system, in which shared data are placed in a shared directory that maintains coherency. Some distributed shared memory architectures may also provide coherency, for example by emulating the foregoing mechanisms.

Coherency may be either "snoopy" or directory-based. In snoopy protocols, coherency may be maintained via write-invalidate, wherein a first cache that snoops a write to the same address in a second cache invalidates its own copy. This forces a read from memory if a program tries to read the value from the first cache. Alternatively, in write-update, a first cache snoops a write to a second cache, and a cache controller (which may include a coherency agent) copies the data out and updates the copy in the first cache.

By way of nonlimiting example, current cache coherency models include MSI (modified, shared, invalid), MESI (modified, exclusive, shared, invalid), MOSI (modified, owned, shared, invalid), MOESI (modified, owned, exclusive, shared, invalid), MERSI (modified, exclusive, read-only or recent, shared, invalid), MESIF (modified, exclusive, shared, invalid, forward), write-once, Synapse, Berkeley, Firefly, and Dragon protocols. Furthermore, ARM processors may use advanced microcontroller bus architecture (AMBA), including AMBA 4 ACE, to provide cache coherency in systems-on-a-chip (SoCs) or elsewhere.

Note that while high-end fabrics such as OPA are provided herein by way of illustration, more generally, fabric 970 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies may arise to supplement or replace some of those listed here, and any such future network topologies and technologies can be or form a part of fabric 970.

In certain embodiments, fabric 970 may provide communication services on various "layers," as originally outlined in the Open Systems Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 10:
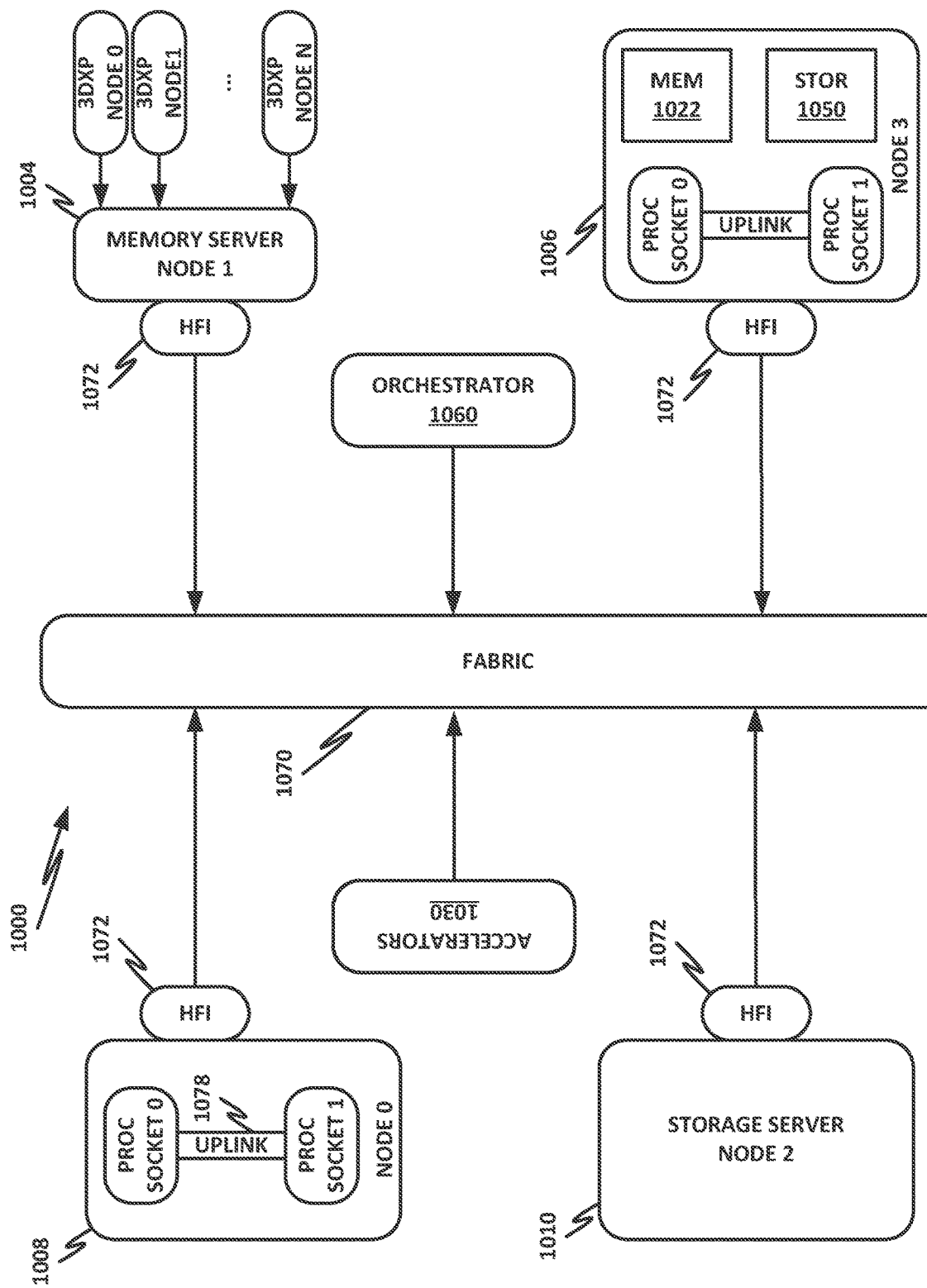
FIG. 10 is a block diagram of selected components of an end-user computing device, according to one or more examples of the present specification.

FIG. 10 is a block diagram of an end-user computing device 1000, according to one or more examples of the present specification. Embodiments of computing device 1000 disclosed herein may be adapted or configured to provide the method of atomic update of access control list rules, according to the teachings of the present specification.

As above, computing device 1000 may provide, as appropriate, cloud service, high-performance computing, telecommunication services, enterprise data center services, or any other compute services that benefit from a computing device 1000.

In this example, a fabric 1070 is provided to interconnect various aspects of computing device 1000. Fabric 1070 may be the same as fabric 970 of FIG. 9, or may be a different fabric. As above, fabric 1070 may be provided by any suitable interconnect technology. In this example, Intel® Omni-Path™ is used as an illustrative and nonlimiting example.

As illustrated, computing device 1000 includes a number of logic elements forming a plurality of nodes. It should be understood that each node may be provided by a physical server, a group of servers, or other hardware. Each server may be running one or more virtual machines as appropriate to its application.

Node 0 1008 is a processing node including a processor socket 0 and processor socket 1. The processors may be, for example, Intel® Xeon™ processors with a plurality of cores, such as 4 or 8 cores. Node 0 1008 may be configured to provide network or workload functions, such as by hosting a plurality of virtual machines or virtual appliances.

Onboard communication between processor socket 0 and processor socket 1 may be provided by an onboard uplink 1078. This may provide a very high speed, short-length interconnect between the two processor sockets, so that virtual machines running on node 0 1008 can communicate with one another at very high speeds. To facilitate this communication, a virtual switch (vSwitch) may be provisioned on node 0 1008, which may be considered to be part of fabric 1070.

Node 0 1008 connects to fabric 1070 via an HFI 1072. HFI 1072 may connect to an Intel® Omni-Path™ fabric. In some examples, communication with fabric 1070 may be tunneled, such as by providing UPI tunneling over Omni-Path™.

Because computing device 1000 may provide many functions in a distributed fashion that in previous generations were provided onboard, a highly capable HFI 1072 may be provided. HFI 1072 may operate at speeds of multiple gigabits per second, and in some cases may be tightly coupled with node 0 1008. For example, in some embodiments, the logic for HFI 1072 is integrated directly with the processors on a system-on-a-chip. This provides very high speed communication between HFI 1072 and the processor sockets, without the need for intermediary bus devices, which may introduce additional latency into the fabric. However, this is not to imply that embodiments where HFI 1072 is provided over a traditional bus are to be excluded. Rather, it is expressly anticipated that in some examples, HFI 1072 may be provided on a bus, such as a PCIe bus, which is a serialized version of PCI that provides higher speeds than traditional PCI. Throughout computing device 1000, various nodes may provide different types of HFIs 1072, such as onboard HFIs and plug-in HFIs. It should also be noted that certain blocks in a system-on-a-chip may be provided as intellectual property (IP) blocks that can be "dropped" into an integrated circuit as a modular unit. Thus, HFI 1072 may in some cases be derived from such an IP block.

Note that in "the network is the device" fashion, node 0 1008 may provide limited or no onboard memory or storage. Rather, node 0 1008 may rely primarily on distributed services, such as a memory server and a networked storage server. Onboard, node 0 1008 may provide only sufficient memory and storage to bootstrap the device and get it communicating with fabric 1070. This kind of distributed architecture is possible because of the very high speeds of contemporary data centers, and may be advantageous because there is no need to over-provision resources for each node. Rather, a large pool of high speed or specialized memory may be dynamically provisioned between a number of nodes, so that each node has access to a large pool of resources, but those resources do not sit idle when that particular node does not need them.

In this example, a node 1 memory server 1004 and a node 2 storage server 1010 provide the operational memory and storage capabilities of node 0 1008. For example, memory server node 1 1004 may provide remote direct memory access (RDMA), whereby node 0 1008 may access memory resources on node 1 1004 via fabric 1070 in a direct memory access fashion, similar to how it would access its own onboard memory. The memory provided by memory server 1004 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 1008, a storage server node 2 1010 may be provided. Storage server 1010 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 1008 may access memory from memory server 1004 and store results on storage provided by storage server 1010. Each of these devices couples to fabric 1070 via a HFI 1072, which provides fast communication that makes these technologies possible.

By way of further illustration, node 3 1006 is also depicted. Node 3 1006 also includes a HFI 1072, along with two processor sockets internally connected by an uplink. However, unlike node 0 1008, node 3 1006 includes its own onboard memory 1022 and storage 1050. Thus, node 3 1006 may be configured to perform its functions primarily onboard, and may not be required to rely upon memory server 1004 and storage server 1010. However, in appropriate circumstances, node 3 1006 may supplement its own onboard memory 1022 and storage 1050 with distributed resources similar to node 0 1008.

Computing device 1000 may also include accelerators 1030. These may provide various accelerated functions, including hardware or co-processor acceleration for functions such as packet processing, encryption, decryption, compression, decompression, network security, or other accelerated functions in the data center. In some examples, accelerators 1030 may include deep learning accelerators that may be directly attached to one or more cores in nodes such as node 0 1008 or node 3 1006. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

In other embodiments, an accelerator could also be provided as an ASIC, field-programmable gate array (FPGA), co-processor, graphics processing unit (GPU), digital signal processor (DSP), or other processing entity, which may optionally be tuned or configured to provide the accelerator function.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), PFM (e.g., Intel® 3D Crosspoint™), external storage, RAID, RAIN, NAS, optical storage, tape drive, backup system, cloud storage, or any combination of the foregoing by way of nonlimiting example. Such a medium could also include instructions programmed into an FPGA, or encoded in hardware on an ASIC or processor.

Figure 11:
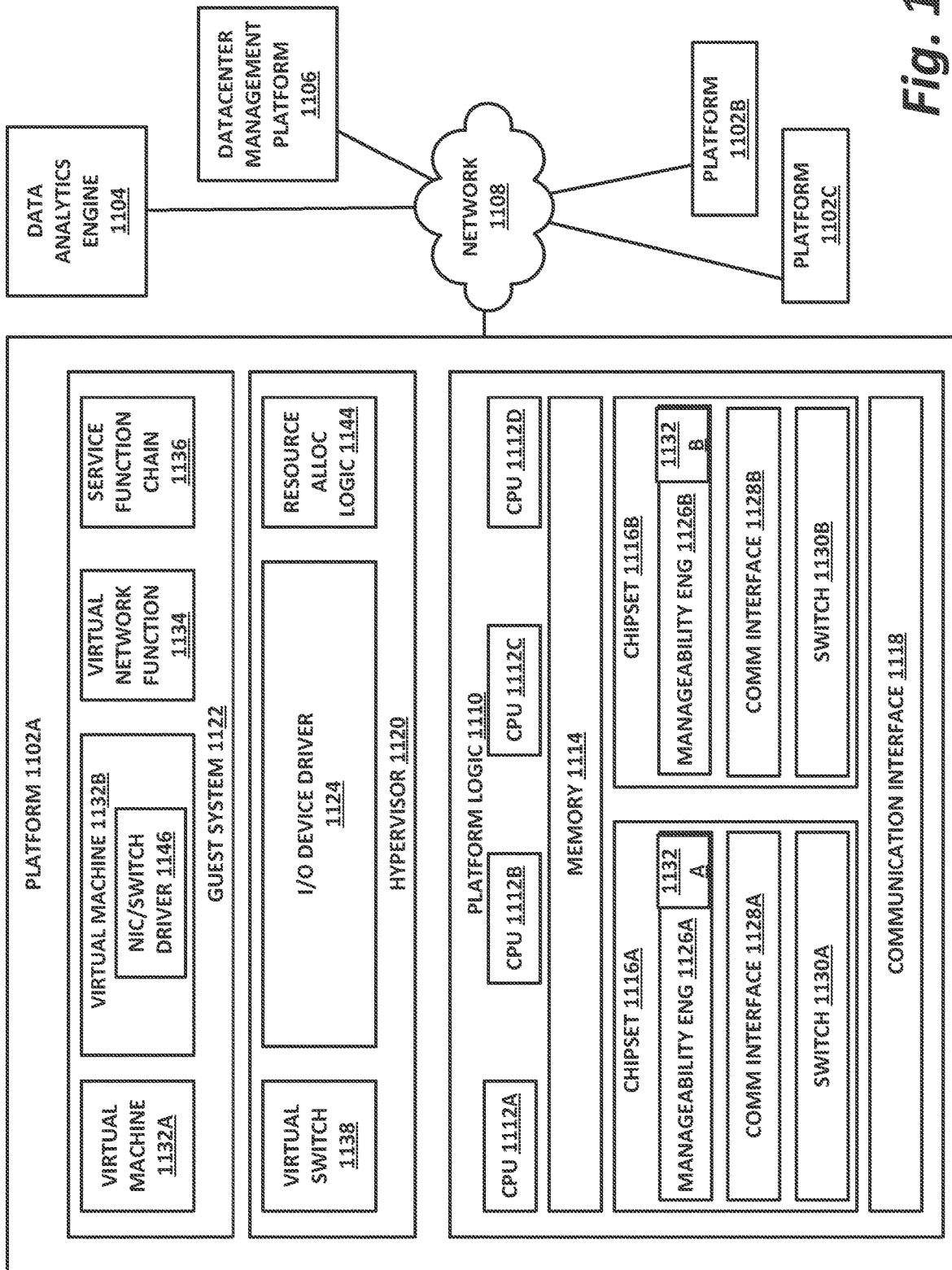
FIG. 11 is a block diagram of components of a computing platform, according to one or more examples of the present specification.

FIG. 11 is a block diagram of components of a computing platform 1102A according to one or more examples of the present specification. Embodiments of computing platform 1102A disclosed herein may be adapted or configured to provide the method of atomic update of access control list rules, according to the teachings of the present specification.

In the embodiment depicted, platforms 1102A, 1102B, and 1102C, along with a data center management platform 1106 and data analytics engine 1104 are interconnected via network 1108. In other embodiments, a computer system may include any suitable number of (i.e., one or more) platforms. In some embodiments (e.g., when a computer system only includes a single platform), all or a portion of the system management platform 1106 may be included on a platform 1102. A platform 1102 may include platform logic 1110 with one or more central processing units (CPUs) 1112, memories 1114 (which may include any number of different modules), chipsets 1116, communication interfaces 1118, and any other suitable hardware and/or software to execute a hypervisor 1120 or other operating system capable of executing workloads associated with applications running on platform 1102. In some embodiments, a platform 1102 may function as a host platform for one or more guest systems 1122 that invoke these applications. Platform 1102A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 1106, hypervisor 1120, or other operating system) of computer platform 1102A may assign hardware resources of platform logic 1110 to perform workloads in accordance with the stress information. In some embodiments, self-diagnostic capabilities may be combined with the stress monitoring to more accurately determine the health of the hardware resources. Each platform 1102 may include platform logic 1110. Platform logic 1110 comprises, among other logic enabling the functionality of platform 1102, one or more CPUs 1112, memory 1114, one or more chipsets 1116, and communication interfaces 1128. Although three platforms are illustrated, computer platform 1102A may be interconnected with any suitable number of platforms. In various embodiments, a platform 1102 may reside on a circuit board that is installed in a chassis, rack, or other suitable structure that comprises multiple platforms coupled together through network 1108 (which may comprise, e.g., a rack or backplane switch).

CPUs 1112 may each comprise any suitable number of processor cores and supporting logic (e.g., uncores). The cores may be coupled to each other, to memory 1114, to at least one chipset 1116, and/or to a communication interface 1118, through one or more controllers residing on CPU 1112 and/or chipset 1116. In particular embodiments, a CPU 1112 is embodied within a socket that is permanently or removably coupled to platform 1102A. Although four CPUs are shown, a platform 1102 may include any suitable number of CPUs.

Memory 1114 may comprise any form of volatile or nonvolatile memory including, without limitation, magnetic media (e.g., one or more tape drives), optical media, random access memory (RAM), ROM, flash memory, removable media, or any other suitable local or remote memory component or components. Memory 1114 may be used for short, medium, and/or long term storage by platform 1102A. Memory 1114 may store any suitable data or information utilized by platform logic 1110, including software embedded in a computer-readable medium, and/or encoded logic incorporated in hardware or otherwise stored (e.g., firmware). Memory 1114 may store data that is used by cores of CPUs 1112. In some embodiments, memory 1114 may also comprise storage for instructions that may be executed by the cores of CPUs 1112 or other processing elements (e.g., logic resident on chipsets 1116) to provide functionality associated with the manageability engine 1126 or other components of platform logic 1110. A platform 1102 may also include one or more chipsets 1116 comprising any suitable logic to support the operation of the CPUs 1112. In various embodiments, chipset 1116 may reside on the same die or package as a CPU 1112 or on one or more different dies or packages. Each chipset may support any suitable number of CPUs 1112. A chipset 1116 may also include one or more controllers to couple other components of platform logic 1110 (e.g., communication interface 1118 or memory 1114) to one or more CPUs. In the embodiment depicted, each chipset 1116 also includes a manageability engine 1126. Manageability engine 1126 may include any suitable logic to support the operation of chipset 1116. In a particular embodiment, a manageability engine 1126 (which may also be referred to as an innovation engine) is capable of collecting real-time telemetry data from the chipset 1116, the CPU(s) 1112 and/or memory 1114 managed by the chipset 1116, other components of platform logic 1110, and/or various connections between components of platform logic 1110. In various embodiments, the telemetry data collected includes the stress information described herein.

In various embodiments, a manageability engine 1126 operates as an out-of-band asynchronous compute agent which is capable of interfacing with the various elements of platform logic 1110 to collect telemetry data with no or minimal disruption to running processes on CPUs 1112. For example, manageability engine 1126 may comprise a dedicated processing element (e.g., a processor, controller, or other logic) on chipset 1116, which provides the functionality of manageability engine 1126 (e.g., by executing software instructions), thus conserving processing cycles of CPUs 1112 for operations associated with the workloads performed by the platform logic 1110. Moreover the dedicated logic for the manageability engine 1126 may operate asynchronously with respect to the CPUs 1112 and may gather at least some of the telemetry data without increasing the load on the CPUs.

A manageability engine 1126 may process telemetry data it collects (specific examples of the processing of stress information are provided herein). In various embodiments, manageability engine 1126 reports the data it collects and/or the results of its processing to other elements in the computer system, such as one or more hypervisors 1120 or other operating systems and/or system management software (which may run on any suitable logic such as system management platform 1106). In particular embodiments, a critical event such as a core that has accumulated an excessive amount of stress may be reported prior to the normal interval for reporting telemetry data (e.g., a notification may be sent immediately upon detection).

Additionally, manageability engine 1126 may include programmable code configurable to set which CPU(s) 1112 a particular chipset 1116 manages and/or which telemetry data may be collected.

Chipsets 1116 also each include a communication interface 1128. Communication interface 1128 may be used for the communication of signaling and/or data between chipset 1116 and one or more I/O devices, one or more networks 1108, and/or one or more devices coupled to network 1108 (e.g., system management platform 1106). For example, communication interface 1128 may be used to send and receive network traffic such as data packets. In a particular embodiment, a communication interface 1128 comprises one or more physical network interface controllers (NICs), also known as network interface cards or network adapters. A NIC may include electronic circuitry to communicate using any suitable physical layer (PHY) and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 1116 (e.g., manageability engine 1126 or switch 1130) and another device coupled to network 1108. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 1128 may allow communication of data (e.g., between the manageability engine 1126 and the data center management platform 1106) associated with management and monitoring functions performed by manageability engine 1126. In various embodiments, manageability engine 1126 may utilize elements (e.g., one or more NICs) of communication interfaces 1128 to report the telemetry data (e.g., to system management platform 1106) in order to reserve usage of NICs of communication interface 1118 for operations associated with workloads performed by platform logic 1110.

Switches 1130 may couple to various ports (e.g., provided by NICs) of communication interface 1128 and may switch data between these ports and various components of chipset 1116 (e.g., one or more Peripheral Component Interconnect Express (PCIe) lanes coupled to CPUs 1112). Switches 1130 may be a physical or virtual (i.e., software) switch.

Platform logic 1110 may include an additional communication interface 1118. Similar to communication interfaces 1128, communication interfaces 1118 may be used for the communication of signaling and/or data between platform logic 1110 and one or more networks 1108 and one or more devices coupled to the network 1108. For example, communication interface 1118 may be used to send and receive network traffic such as data packets. In a particular embodiment, communication interfaces 1118 comprise one or more physical NICs. These NICs may enable communication between any suitable element of platform logic 1110 (e.g., CPUs 1112 or memory 1114) and another device coupled to network 1108 (e.g., elements of other platforms or remote computing devices coupled to network 1108 through one or more networks).

Platform logic 1110 may receive and perform any suitable types of workloads. A workload may include any request to utilize one or more resources of platform logic 1110, such as one or more cores or associated logic. For example, a workload may comprise a request to instantiate a software component, such as an I/O device driver 1124 or guest system 1122; a request to process a network packet received from a virtual machine 1132 or device external to platform 1102A (such as a network node coupled to network 1108); a request to execute a process or thread associated with a guest system 1122, an application running on platform 1102A, a hypervisor 1120 or other operating system running on platform 1102A; or other suitable processing request.

A virtual machine 1132 may emulate a computer system with its own dedicated hardware. A virtual machine 1132 may run a guest operating system on top of the hypervisor 1120. The components of platform logic 1110 (e.g., CPUs 1112, memory 1114, chipset 1116, and communication interface 1118) may be virtualized such that it appears to the guest operating system that the virtual machine 1132 has its own dedicated components.

A virtual machine 1132 may include a virtualized NIC (vNIC), which is used by the virtual machine as its network interface. A vNIC may be assigned a media access control (MAC) address or other identifier, thus allowing multiple virtual machines 1132 to be individually addressable in a network.

VNF 1134 may comprise a software implementation of a functional building block with defined interfaces and behavior that can be deployed in a virtualized infrastructure. In particular embodiments, a VNF 1134 may include one or more virtual machines 1132 that collectively provide specific functionalities (e.g., WAN optimization, virtual private network (VPN) termination, firewall operations, load-balancing operations, security functions, etc.). A VNF 1134 running on platform logic 1110 may provide the same functionality as traditional network components implemented through dedicated hardware. For example, a VNF 1134 may include components to perform any suitable NFV workloads, such as virtualized evolved packet core (vEPC) components, mobility management entities, 3rd Generation Partnership Project (3GPP) control and data plane components, etc.

SFC 1136 is a group of VNFs 1134 organized as a chain to perform a series of operations, such as network packet processing operations. Service function chaining may provide the ability to define an ordered list of network services (e.g. firewalls, load balancers) that are stitched together in the network to create a service chain.

A hypervisor 1120 (also known as a virtual machine monitor) may comprise logic to create and run guest systems 1122. The hypervisor 1120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 1110. Services of hypervisor 1120 may be provided by virtualizing in software or through hardware assisted resources that require minimal software intervention, or both. Multiple instances of a variety of guest operating systems may be managed by the hypervisor 1120. Each platform 1102 may have a separate instantiation of a hypervisor 1120.

Hypervisor 1120 may be a native or bare-metal hypervisor that runs directly on platform logic 1110 to control the platform logic and manage the guest operating systems. Alternatively, hypervisor 1120 may be a hosted hypervisor that runs on a host operating system and abstracts the guest operating systems from the host operating system. Hypervisor 1120 may include a virtual switch 1138 that may provide virtual switching and/or routing functions to virtual machines of guest systems 1122. The virtual switch 1138 may comprise a logical switching fabric that couples the vNICs of the virtual machines 1132 to each other, thus creating a virtual network through which virtual machines may communicate with each other.

Virtual switch 1138 may comprise a software element that is executed using components of platform logic 1110. In various embodiments, hypervisor 1120 may be in communication with any suitable entity (e.g., a SDN controller) which may cause hypervisor 1120 to reconfigure the parameters of virtual switch 1138 in response to changing conditions in platform 1102 (e.g., the addition or deletion of virtual machines 1132 or identification of optimizations that may be made to enhance performance of the platform).

Hypervisor 1120 may also include resource allocation logic 1144, which may include logic for determining allocation of platform resources based on the telemetry data (which may include stress information). Resource allocation logic 1144 may also include logic for communicating with various components of platform logic 1110 entities of platform 1102A to implement such optimization, such as components of platform logic 1110.

Any suitable logic may make one or more of these optimization decisions. For example, system management platform 1106; resource allocation logic 1144 of hypervisor 1120 or other operating system; or other logic of computer platform 1102A may be capable of making such decisions. In various embodiments, the system management platform 1106 may receive telemetry data from and manage workload placement across multiple platforms 1102. The system management platform 1106 may communicate with hypervisors 1120 (e.g., in an out-of-band manner) or other operating systems of the various platforms 1102 to implement workload placements directed by the system management platform.

The elements of platform logic 1110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 1102A may be coupled together in any suitable manner such as through one or more networks 1108. A network 1108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 12:
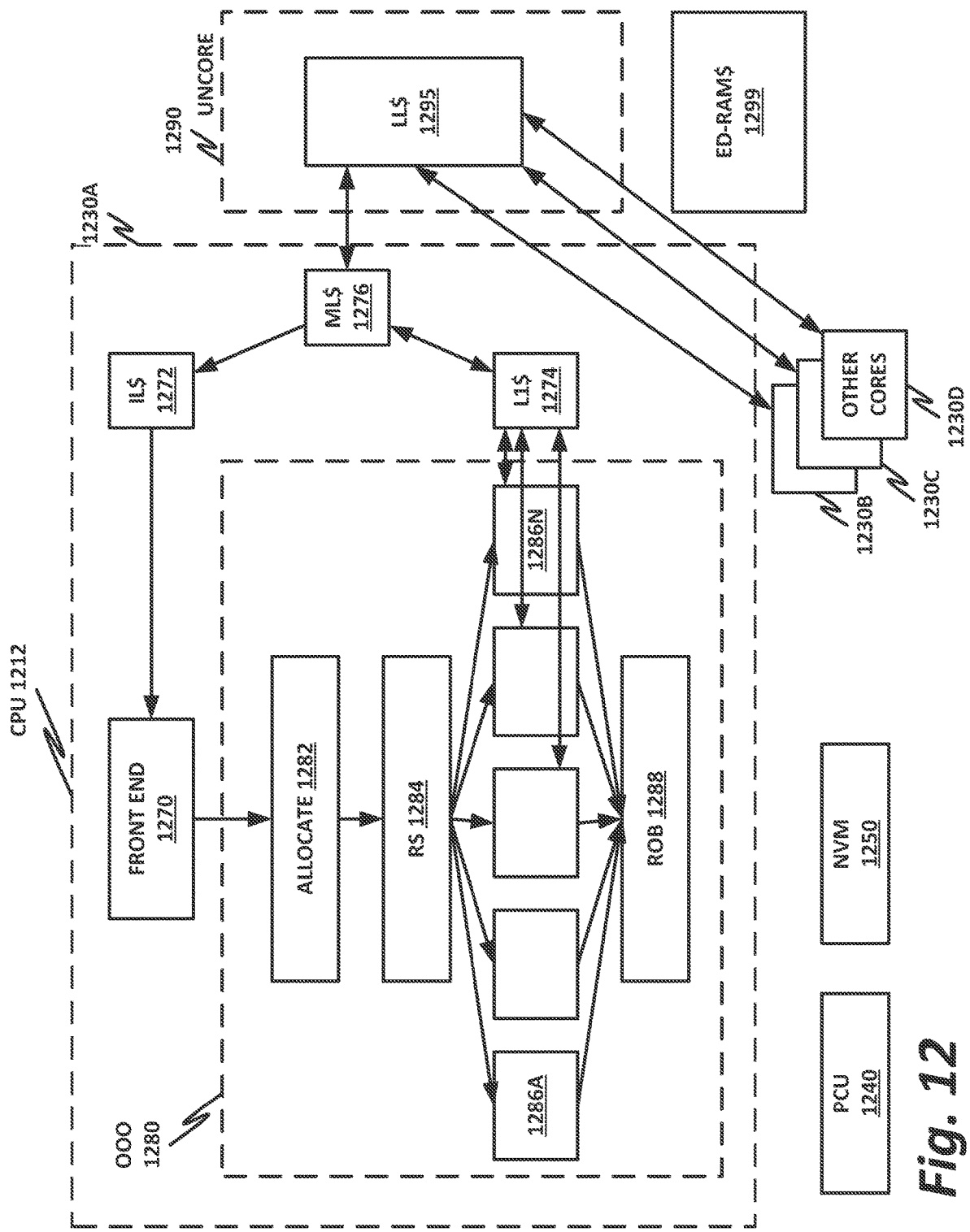
FIG. 12 is a block diagram of a central processing unit (CPU), according to one or more examples of the present specification.

FIG. 12 illustrates a block diagram of a central processing unit (CPU) 1212 in accordance with certain embodiments. Embodiments of CPU 1212 disclosed herein may be adapted or configured to provide the method of atomic update of access control list rules, according to the teachings of the present specification.

Although CPU 1212 depicts a particular configuration, the cores and other components of CPU 1212 may be arranged in any suitable manner. CPU 1212 may comprise any processor or processing device, such as a microprocessor, an embedded processor, a digital signal processor (DSP), a network processor, an application processor, a co-processor, an SoC, or other device to execute code. CPU 1212, in the depicted embodiment, includes four processing elements (cores 1230 in the depicted embodiment), which may include asymmetric processing elements or symmetric processing elements. However, CPU 1212 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 1230A includes an out-of-order processor that has a front end unit 1270 used to fetch incoming instructions, perform various processing (e.g. caching, decoding, branch predicting, etc.) and passing instructions/operations along to an out-of-order (OOO) engine. The OOO engine performs further processing on decoded instructions.

A front end 1270 may include a decode module coupled to fetch logic to decode fetched elements. Fetch logic, in one embodiment, includes individual sequencers associated with thread slots of cores 1230. Usually a core 1230 is associated with a first ISA, which defines/specifies instructions executable on core 1230. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 1230, in one embodiment, recognize the same ISA (or a subset thereof). Alternatively, in a heterogeneous core environment, a decoder of one or more cores (e.g., core 1230B) may recognize a second ISA (either a subset of the first ISA or a distinct ISA).

In the embodiment depicted, the out-of-order engine includes an allocate unit 1282 to receive decoded instructions, which may be in the form of one or more micro-instructions or uops, from front end unit 1270, and allocate them to appropriate resources such as registers and so forth. Next, the instructions are provided to a reservation station 1284, which reserves resources and schedules them for execution on one of a plurality of execution units 1286A-1286N. Various types of execution units may be present, including, for example, arithmetic logic units (ALUs), load and store units, vector processing units (VPUs), floating point execution units, among others. Results from these different execution units are provided to a reorder buffer (ROB) 1288, which take unordered results and return them to correct program order.

In the embodiment depicted, both front end unit 1270 and out-of-order engine 1280 are coupled to different levels of a memory hierarchy. Specifically shown is an instruction level cache 1272, that in turn couples to a mid-level cache 1276, that in turn couples to a last level cache 1295. In one embodiment, last level cache 1295 is implemented in an on-chip (sometimes referred to as uncore) unit 1290. Uncore 1290 may communicate with system memory 1299, which, in the illustrated embodiment, is implemented via embedded DRAM (eDRAM). The various execution units 1286 within OOO engine 1280 are in communication with a first level cache 1274 that also is in communication with mid-level cache 1276. Additional cores 1230B-1230D may couple to last level cache 1295 as well.

In particular embodiments, uncore 1290 may be in a voltage domain and/or a frequency domain that is separate from voltage domains and/or frequency domains of the cores. That is, uncore 1290 may be powered by a supply voltage that is different from the supply voltages used to power the cores and/or may operate at a frequency that is different from the operating frequencies of the cores.

CPU 1212 may also include a power control unit (PCU) 1240. In various embodiments, PCU 1240 may control the supply voltages and the operating frequencies applied to each of the cores (on a per-core basis) and to the uncore. PCU 1240 may also instruct a core or uncore to enter an idle state (where no voltage and clock are supplied) when not performing a workload.

In various embodiments, PCU 1240 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 1240 may detect stress characteristics at any suitable interval.

In various embodiments, PCU 1240 is a component that is discrete from the cores 1230. In particular embodiments, PCU 1240 runs at a clock frequency that is different from the clock frequencies used by cores 1230. In some embodiments where the PCU is a microcontroller, PCU 1240 executes instructions according to an ISA that is different from an ISA used by cores 1230.

In various embodiments, CPU 1212 may also include a nonvolatile memory 1250 to store stress information (such as stress characteristics, incremental stress values, accumulated stress values, stress accumulation rates, or other stress information) associated with cores 1230 or uncore 1290, such that when power is lost, the stress information is maintained.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a network switching apparatus, comprising: a plurality ingress port; a plurality of egress ports; a ternary content addressable memory (TCAM) comprising a plurality of chunks, wherein the chunks can be atomically enabled or disabled; a switching circuit to switch traffic from the ingress port to a selected egress port according to an access control list (ACL) of the TCAM; and one or more non-transitory mediums having stored thereon instructions to atomically add or update two or more target rules, comprising: add the two or more target rules to one or more target-rule chunks; and atomically enable the target-rule chunks.

Example 2 includes the network switching apparatus of example 1, wherein adding the two or more rules to the target-rule chunk comprises adding the rules with an inactive status while the target-rule chunk is enabled, and disabling the target-rule chunk.

Example 3 includes the network switching apparatus of example 1, wherein the one or more non-transitory mediums further have instructions to simultaneously disable one or more outdated-rules chunks having outdated rules while enabling the target-rule chunks.

Example 4 includes the network switching apparatus of example 1, wherein the one or more non-transitory mediums further have instructions to create a copy of an outdated rule with an active status, the copy having the same priority as the outdated rule and residing on a chunk other than a chunk hosting the original.

Example 5 includes the network switching apparatus of example 4, wherein the one or more non-transitory mediums further have instructions to: identify a source rule to be updated, the source rule being located on a source-rule chunk; make a new rule having new criteria and an inactive status; add the new rule to an enabled updated-rule chunk; disable the updated-rule chunk; change the status of the new rule to active; and simultaneously enable the updated-rule chunk while disabling the source-rule chunk.

Example 6 includes the network switching apparatus of example 1, wherein the one or more non-transitory mediums further have instructions to: identify one or more source rules to be disabled; group the source rule onto one or more source-rule chunks; group the two or more target rules onto one or more target-rule chunks, the target rules having inactive status; while the one or more target-rule chunks are disabled, change the target rules to active status; and simultaneously disable the source-rule chunks while enabling the target-rule chunks.

Example 7 includes the network switching apparatus of example 6, wherein the one or more mediums further have instructions to disable the one or more target-rule chunks before changing the target rules to active status.

Example 8 includes the network switching apparatus of example 6, wherein the source-rule chunks are exclusive chunks to be selected with reference to priority.

Example 9 includes the network switching apparatus of example 6, wherein the target-rule chunks are exclusive chunks to be selected with reference to priority.

Example 10 includes the network switching apparatus of example 6, wherein one or more mediums further have instructions to clear or inactivate the source rules on the one or more source-rule chunks, and enable the one or more source rule chunks.

Example 11 includes the network switching apparatus of any of examples 1-10, wherein enabling and disabling the chunks comprises writing to an ACL configuration register, the ACL configuration register comprising individual flags to control the plurality of chunks in parallel.

Example 12 includes the network switching apparatus of any of examples 1-10, wherein the ACL table is a ternary content-addressable memory (TCAM).

Example 13 includes the network switching apparatus of any of examples 1-10, wherein the switching controller is an application-specific integrated circuit (ASIC) or field-programmable gate array (FPGA).

Example 14 includes one or more tangible, non-transitory computer-readable storage mediums having stored thereon instructions for atomically updating an access control list (ACL) table having a plurality of chunks that can be atomically enabled and disabled, the instructions to instruct a processor to: add the two or more target rules to one or more target-rule chunks; and atomically enable the target-rule chunks.

Example 15 includes the one or more tangible, non-transitory computer-readable storage mediums of example 14, wherein adding the two or more rules to the target-rule chunk comprises adding the rules with an inactive status while the target-rule chunk is enabled, and disabling the target-rule chunk.

Example 16 includes the one or more tangible, non-transitory computer-readable storage mediums of example 14, wherein the instructions are further to instruct the processor to simultaneously disable one or more outdated-rules chunks having outdated rules while enabling the target-rule chunks.

Example 17 includes the one or more tangible, non-transitory computer-readable storage mediums of example 14, wherein the instructions are further to instruct the processor to create a copy of an outdated rule with an active status, the copy having the same priority as the outdated rule and residing on a chunk other than a chunk hosting the original.

Example 18 includes the one or more tangible, non-transitory computer-readable storage mediums of example 17, wherein the instructions are further to instruct the processor to: identify a source rule to be updated, the source rule located on a source-rule chunk; make a new rule having new criteria and an inactive status; add the new rule to an enabled updated-rule chunk; disable the updated-rule chunk; change the status of the new rule to active; and simultaneously enable the updated-rule chunk while disabling the source-rule chunk.

Example 19 includes the one or more tangible, non-transitory computer-readable storage mediums of example 14, wherein the instructions are further to instruct the processor to: identify one or more source rules to be disabled; group the source rule onto one or more source-rule chunks; group the two or more target rules onto one or more target-rule chunks, the target rules having inactive status; while the one or more target-rule chunks are disabled, change the target rules to active status; and simultaneously disable the source-rule chunks while enabling the target-rule chunks.

Example 20 includes the one or more tangible, non-transitory computer-readable storage mediums of example 19, wherein the instructions are further to instruct the processor to disable the one or more target-rule chunks before changing the target rules to active status.

Example 21 includes the one or more tangible, non-transitory computer-readable storage mediums of example 9, wherein the source-rule chunks are exclusive chunks to be selected with reference to priority.

Example 22 includes the one or more tangible, non-transitory computer-readable storage mediums of example 19, wherein the target-rule chunks are exclusive chunks to be selected with reference to priority.

Example 23 includes the one or more tangible, non-transitory computer-readable storage mediums of example 19, wherein the instructions are further to instruct the processor to clear or inactivate the source rules on the one or more source-rule chunks, and enable the one or more source rule chunks.

Example 24 includes an apparatus comprising the one or more tangible, non-transitory computer-readable mediums of any of examples 14-23.

Example 25 includes the apparatus of example 24, further comprising means to carry out the instructions.

Example 26 includes the apparatus of example 25, wherein the means comprise a microprocessor.

Example 27 includes the apparatus of example 25, further comprising an ingress interface and a plurality of egress interfaces.

Example 28 includes the apparatus of example 25, wherein the apparatus is a network switch or router.

Example 29 includes a method of providing atomic update of an access control list (ACL) table, comprising: communicatively coupling to the ACL table, wherein the ACL table comprises a plurality of chunks configured to receive enable signals in parallel, the enable signals to enable or disable a single chunk; add target rules to one or more target-rule chunks; and atomically enable the target-rule chunks.

Example 30 includes the method of example 29, wherein adding the two or more rules to the target-rule chunk comprises adding the rules with an inactive status while the target-rule chunk is enabled, and disabling the target-rule chunk.

Example 31 includes the method of example 29, further comprising atomically disabling one or more outdated-rules chunks having outdated rules while enabling the target-rule chunks.

Example 32 includes the method of example 29, further comprising creating a copy of an outdated rule with an active status, the copy having the same priority as the outdated rule and residing on a chunk other than a chunk hosting the original.

Example 33 includes the method of example 32, further comprising: identifying a source rule to be updated, the source rule located on a source-rule chunk; making a new rule having new criteria and an inactive status; adding the new rule to an enabled updated-rule chunk; disabling the updated-rule chunk; changing the status of the new rule to active; and atomically enabling the updated-rule chunk and disabling the source-rule chunk.

Example 34 includes the method of example 29, further comprising: identifying one or more source rules to be disabled; grouping the source rule onto one or more source-rule chunks; grouping the two or more target rules onto one or more target-rule chunks, the target rules having inactive status; while the one or more target-rule chunks are disabled, changing the target rules to active status; and atomically disabling the source-rule chunks and enabling the target-rule chunks.

Example 35 includes the method of example 29, further comprising disabling the one or more target-rule chunks.

Example 36 includes the method of example 35, wherein the source-rule chunks are exclusive chunks to be selected with reference to priority.

Example 37 includes the method of example 35, wherein the target-rule chunks are exclusive chunks to be selected with reference to priority.

Example 38 includes the method of example 35, further comprising clearing or inactivating the source rules on the one or more source-rule chunks, and enabling the one or more source rule chunks.

Example 39 includes an apparatus comprising means for performing the method of any of examples 29-38.

Example 40 includes the apparatus of example 39, wherein the means comprise a processor and a memory.

Example 41 includes the apparatus of example 39, further comprising a ternary content-addressable memory (TCAM) to hold the ACL table.

Example 42 includes the apparatus of example 39, further comprising an ACL configuration register to atomically enable and disable the chunks.

Example 43 includes one or more tangible, non-transitory computer-readable mediums having stored thereon instructions that, when executed, perform the method or realize the apparatus of any of examples 29-42.

What is claimed is:

1. A network switching apparatus, comprising:
    an ingress port;
    a plurality of egress ports;
    a ternary content addressable memory (TCAM) comprising a plurality of chunks, wherein the chunks can be atomically enabled or disabled;
    a switching circuit to switch traffic from the ingress port to a selected egress port according to an access control list (ACL) of the TCAM; and
    one or more non-transitory mediums having stored thereon instructions to atomically add or update two or more target rules, wherein the instructions are to:
        add the two or more target rules to one or more target-rule chunks, comprising adding the target rules with an inactive status while the target-rule chunk is enabled, and disabling the target-rule chunk; and
        atomically enable the target-rule chunks.

2. The network switching apparatus of claim 1, wherein the one or more non-transitory mediums further have instructions to simultaneously disable one or more outdated-rules chunks having outdated rules while enabling the target-rule chunks.

3. The network switching apparatus of claim 1, wherein the one or more non-transitory mediums further have instructions to create a copy of an outdated rule with an active status, the copy having the same priority as the outdated rule and residing on a chunk other than a chunk hosting the outdated rule.

4. The network switching apparatus of claim 3, wherein the one or more non-transitory mediums further have instructions to:
    identify a source rule to be updated, the source rule being located on a source-rule chunk;
    make a new rule having new criteria and an inactive status;
    add the new rule to an enabled updated-rule chunk;
    disable the updated-rule chunk;
    change the status of the new rule to active; and
    simultaneously enable the updated-rule chunk while disabling the source-rule chunk.

5. The network switching apparatus of claim 1, wherein the one or more non-transitory mediums further have instructions to:
    identify one or more source rules to be disabled;
    group the source rule onto one or more source-rule chunks;
    group the two or more target rules onto one or more target-rule chunks, the target rules having inactive status;
    while the one or more target-rule chunks are disabled, change the target rules to active status; and
    simultaneously disable the source-rule chunks while enabling the target-rule chunks.

6. The network switching apparatus of claim 5, wherein the one or more non-transitory mediums further have instructions to disable the one or more target-rule chunks before changing the target rules to active status.

7. The network switching apparatus of claim 5, wherein the source-rule chunks are exclusive chunks to be selected with reference to priority.

8. The network switching apparatus of claim 5, wherein the target-rule chunks are exclusive chunks to be selected with reference to priority.

9. The network switching apparatus of claim 5, wherein one or more mediums further have instructions to clear or inactivate the source rules on the one or more source-rule chunks, and enable the one or more source rule chunks.

10. The network switching apparatus of claim 1, wherein enabling and disabling the chunks comprises writing to an ACL configuration register, the ACL configuration register comprising individual flags to control the plurality of chunks in parallel.

11. The network switching apparatus of claim 1, wherein the switching circuit is an application-specific integrated circuit (ASIC) or field-programmable gate array (FPGA).

12. One or more tangible, non-transitory computer-readable storage mediums having stored thereon instructions for atomically updating an access control list (ACL) table having a plurality of chunks that can be atomically enabled and disabled, the instructions to instruct a processor to:
provide network switching services, comprising switching network traffic from ingress port to a plurality of egress ports, according to the ACL table, wherein the ACL table is stored on a ternary content addressable memory (TCAM);
add two or more target rules to one or more target-rule chunks
of the TCAM, comprising adding the target rules with an inactive status while the target-rule chunk is enabled, and disabling the target-rule chunk; and
atomically enable the target-rule chunks.

13. The one or more tangible, non-transitory computer-readable storage mediums of claim 12, wherein the instructions are further to instruct the processor to simultaneously disable one or more outdated-rules chunks having outdated rules while enabling the target-rule chunks.

14. The one or more tangible, non-transitory computer-readable storage mediums of claim 12, wherein the instructions are further to instruct the processor to create a copy of an outdated rule with an active status, the copy having the same priority as the outdated rule and residing on a chunk than a chunk hosting the outdated rule.

15. The one or more tangible, non-transitory computer-readable storage mediums of claim 14, wherein the instructions are further to instruct the processor to:
identify a source rule to be updated, the source rule located on a source-rule chunk;
make a new rule having new criteria and an inactive status;
add the new rule to an enabled updated-rule chunk;
disable the updated-rule chunk;
change the status of the new rule to active; and
simultaneously enable the updated-rule chunk while disabling the source-rule chunk.

16. The one or more tangible, non-transitory computer-readable storage mediums of claim 12, wherein the instructions are further to instruct the processor to:
identify one or more source rules to be disabled;
group the source rule onto one or more source-rule chunks;
group the two or more target rules onto one or more target-rule chunks, the target rules having inactive status;
while the one or more target-rule chunks are disabled, change the target rules to active status; and
simultaneously disable the source-rule chunks while enabling the target-rule chunks.

17. The one or more tangible, non-transitory computer-readable storage mediums of claim 16, wherein the instructions are further to instruct the processor to disable the one or more target-rule chunks before changing the target rules to active status.

18. The one or more tangible, non-transitory computer-readable storage mediums of claim 8, wherein the source-rule chunks are exclusive chunks to be selected with reference to priority.

19. The one or more tangible, non-transitory computer-readable storage mediums of claim 16, wherein the target-rule chunks are exclusive chunks to be selected with reference to priority.

20. The one or more tangible, non-transitory computer-readable storage mediums of claim 16, wherein the instructions are further to instruct the processor to clear or inactivate the source rules on the one or more source-rule chunks, and enable the one or more source rule chunks.

21. A method of providing atomic update of an access control list (ACL) table, comprising:
providing network switching between an ingress port and a plurality of egress ports, according to the ACL table;
communicatively coupling to the ACL table, wherein the ACL table is stored on a ternary content addressable memory (TCAM) comprising a plurality of chunks configured to receive enable signals in parallel, the enable signals to enable or disable a single chunk;
add target rules to one or more target-rule chunks, comprising adding the target rules with an inactive status while the target-rule chunk is enabled, and disabling the target-rule chunk; and
atomically enable the target-rule chunks.

22. The method of claim 21, further comprising simultaneously disabling one or more outdated-rules chunks having outdated rules while enabling the target-rule chunks.

23. The method of claim 21, further comprising creating a copy of an outdated rule with an active status, the copy having the same priority as the outdated rule and residing on a chunk other than a chunk hosting the outdated rule.

24. The method of claim 21, further comprising:
identifying a source rule to be updated, the source rule located on a source-rule chunk;
making a new rule having new criteria and an inactive status;
adding the new rule to an enabled updated-rule chunk;
disabling the updated-rule chunk;
changing the status of the new rule to active; and
simultaneously enabling the updated-rule chunk while disabling the source-rule chunk.

* * * * *